Aug. 16, 1927.
E. R. BURTNETT
INTERNAL COMBUSTION ENGINE
Filed Nov. 23, 1925
1,639,164
2 Sheets-Sheet 1
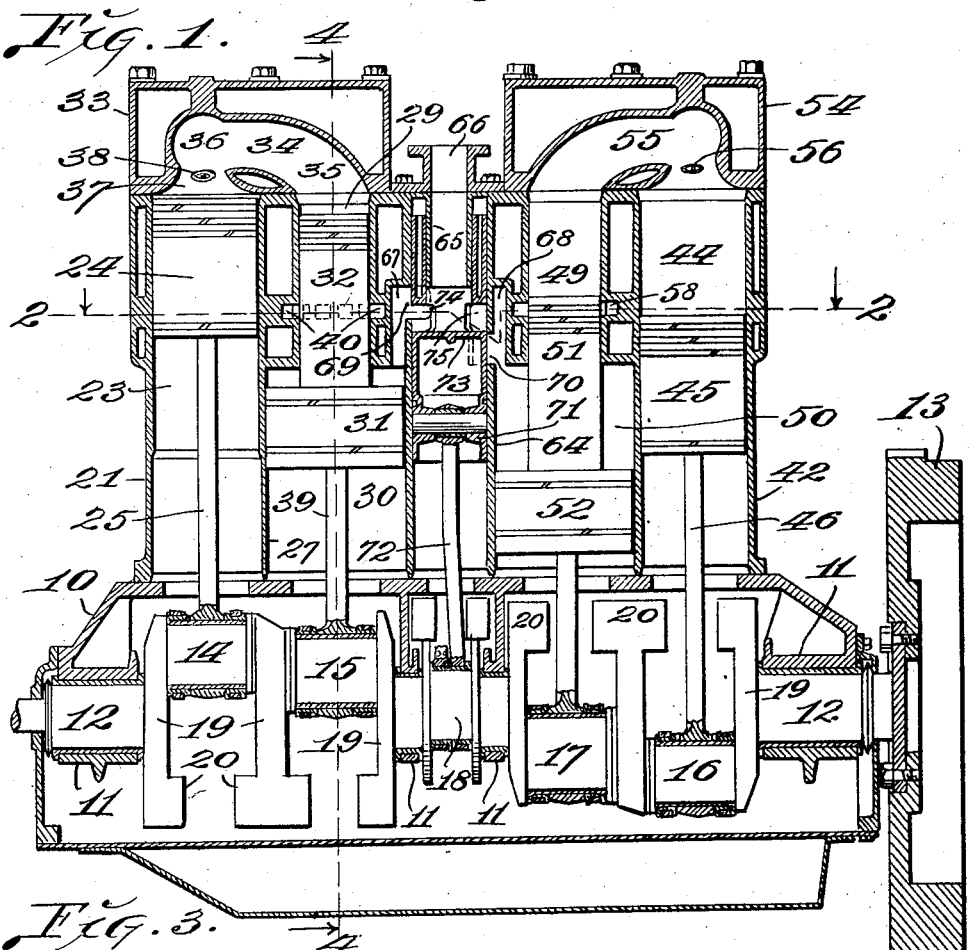

Aug. 16, 1927. 1,639,164
E. R. BURTNETT
INTERNAL COMBUSTION ENGINE
Filed Nov. 23, 1925    2 Sheets-Sheet 2

INVENTOR,
E. R. Burtnett.
By Martin P. Smith, Atty.

Patented Aug. 16, 1927.

1,639,164

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed November 23, 1925. Serial No. 70,826.

My invention relates to an internal combustion engine of the two stroke cycle type and has for its principal objects the provision of an engine having four firing units arranged so as to develop a uniform torque of relatively great power for a given weight and overall dimensions, to provide an engine having four dual cylinder combustion units, one cylinder of each two cylinder combustion unit being the smaller diameter portion of a two-diameter cylinder and the crank to which the piston of the smaller cylinder of each of the four dual cylinder combustion chambers being in advance rotatively relative to the crank to which the piston of the second and larger cylinder of each of the four dual cylinder combustion chambers is connected in order to obtain increased torque at low engine speeds, to provide an engine that is relatively simple in construction with all power pumping and valve pistons directly connected to one crank shaft, to provide an engine structure that will be effective in producing improved charge volume pumping and combustion functions together with improved valvular functions and at the same time effecting a material reduction in mechanical losses, and further to adapt four two-cycle combined pumping and combustion reciprocating units to a crank shaft that is balanced so as to compensate for alternating reciprocating forces that may be developed at the crank pins by the 90° or V-arrangement of the cylinders.

Further objects of my invention are to provide an engine of the character referred to wherein the cylinders are arranged in two rows, thereby providing a V-structure, the legs or rows of cylinders thereof being disposed substantially 90° apart, to arrange the combustion cylinders in pairs to produce dual combustion chambers, to arrange one cylinder of each pair so that it has a charge volume pumping chamber, to provide an improved piston valve arrangement for controlling the admission of the fresh charge volumes to the pumping chambers, and further to provide an improved arrangement of transfer ducts between the various pumping chambers and the combustion chambers.

With the foregoing and other objects in view, my invention consists in certain novel features of construction and arrangement of parts that will hereinafter be more fully described and claimed and illustrated in the accompanying drawings, in which—

Fig. 1 is a vertical section taken lengthwise through the center of one of the legs or rows of cylinders of an engine embodying the principles of my invention.

Fig. 2 is a horizontal section taken on the line 2—2 of Fig. 1.

Fig. 3 is an enlarged detail section taken approximately on the line 3—3 of Fig. 2.

Figure 4:
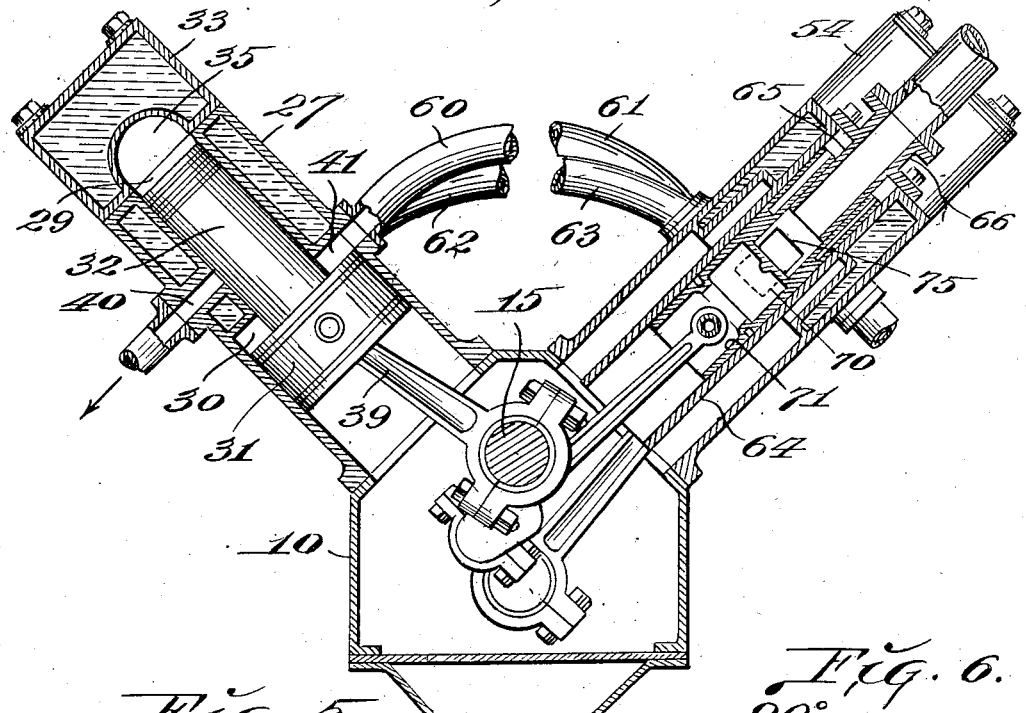
Fig. 4 is a transverse section taken approximately on the line 4—4 of Fig. 1.

Referring by numerals to the accompanying drawings which illustrate a practical embodiment of my invention, 10 designates a crank case having four main bearings 11 for a crank shaft 12, the latter carrying on its rear portion a conventional flywheel 13. This crank shaft is provided with five cranks, the crank pins of which are designated by the numerals 14, 15, 16, 17, and 18 respectively. Pin 14 forms a part of the first crank from the forward end of the crank shaft while pin 15 forms a part of the crank that is second from the forward end of the crank shaft. Pin 16 forms a part of the crank that occupies the first position from the rear end of the crank shaft while pin 17 forms a part of the crank that occupies the second position from the rear end of said crank shaft. Crank 18, which is effective in actuating the piston valves of the engine, occupies an intermediate position between the cranks having the pins 15 and 17 and between the two intermediate main bearings 11. Crank pins 14 and 16 are disposed diametrically opposite to each other or 180° apart and likewise pins 15 and 17 are disposed diametrically opposite to each other or 180° apart.

Crank pin 15 occupies an angular position approximately 45° in advance in the direction of rotation from pin 14 and likewise pin 17 occupies an angular position of approximately 45° in advance in the direction of rotation from pin 16. The piston valve crank pin 18 has a much shorter radius than the radii of the pins 14 to 17 inclusive, and said pin 18 occupies an angular position midway between the pins 14 and 17 or a position approximately 67½° from said last-mentioned crank pins.

All of the crank arms 19 of the crank shaft are provided with counterbalancing weights 20, the latter being disposed diametrically opposite to the respective crank pins and thus the crank shaft is counterbalanced so as to compensate for alternating reciprocatory forces that may be developed at the crank pin as a result of the V-arrangement of the pistons within the two rows of combustion and pumping chambers.

Fixed to and surmounting the crank shaft are two rows of cylinders, five cylinders in each row and the cylinders of each row may be formed en bloc or separately as desired. The central planes of the two rows of cylinders are disposed substantially 90° apart and said planes intersect the axis of the crank shaft, hence the axes of the two sets of five cylinders each intersect said crank shaft axis.

I have illustrated in detail only one row or wing of the V-cylinder arrangement, but it will be understood that the structure of the two rows of cylinders is identical.

The first cylinders in the two rows from the front end of the engine are designated by the numerals 21 and 22, said cylinders having straight internal diameters to provide combustion chambers such as 23, and arranged for operation within said combustion chambers are pistons such as 24 both of which are connected by conventional connecting rods such as 25 to crank pin 14 of the first crank from the forward end of the crank shaft.

Formed through the walls of cylinders 21 and 22 are charge volume inlet ports such as 26, said ports being located so that they are uncovered and open only while the pistons 24 are at the lower or outer ends of their strokes.

The second cylinders in both rows from the front end of the engine, and which are designated by the numerals 27 and 28 respectively, are each provided with a two-diameter chamber, the portion of least diameter being formed in the head end of the corresponding cylinder and functioning as a combustion chamber such as 29 and the portion of greater diameter that is formed in the crank end of the respective cylinder functioning as a pumping chamber 30.

Arranged for operation within each two-diameter chamber is a two-diameter piston, the larger portion 31 of which functions as a pumping piston within the corresponding pumping chamber 30 and the portion 32 of least diameter functioning as a power piston within the corresponding combustion chamber 29.

Figures 5, 6:
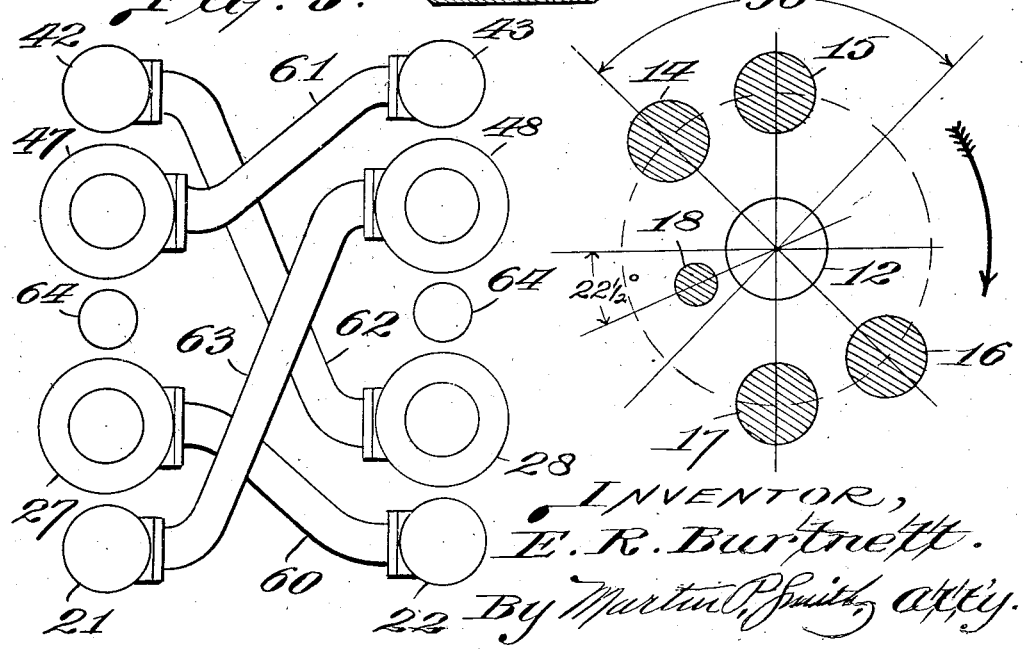
Fig. 5 is a diagrammatic plan view and showing the arrangement of the transfer ducts between the pumping chambers and dual combustion chambers.
Fig. 6 is a diagrammatic view illustrating the relative angular positions of the crank throws of the crank shaft.

Secured on the head ends of the cylinders 21 and 27, and 22 and 28, Fig. 5 respectively, are head blocks such as 33 within which are formed ducts or chambers such as 34 and which latter connect the head or inner ends of the corresponding combustion chambers 23 and 29 and functioning as common compression and combustion clearance chambers for said combustion chambers 23 and 29. Each of these common clearance and combustion chambers comprises a curved portion 35 that joins the head end of each combustion chamber 29 with a substantially spherical pocket 36 that is formed in the block 33 directly above combustion chamber 23 and said pocket being connected by a short tapered throat 37 with the head or inner end of chamber 23.

An ignition device such as a spark plug 38 is seated in the side of head 33 so that the inner ends of the terminals of its electrodes project into throat 37. Both the two-diameter pistons that operate in the pairs of two-diameter chambers 29 and 30 are connected by conventional connecting rods such as 39 to pin 15 which forms a part of the second crank throw from the front end of the crank shaft.

Formed in the walls of the cylinders that surround the combustion chambers 29 and leading outwardly therefrom are exhaust ports such as 40, the same being located so that they are uncovered and open only while the pistons 32 are at the lower or outer ends of their strokes. Formed through the cylinder walls that surround the pumping chambers 30 and leading from the upper ends of the latter are pumped charge volume outlet ports such as 41.

The cylinders 42 and 43 which are the rear cylinders of the two rows or the first cylinders from the rear end of the engine, are duplicates of the cylinders 21 and 22 and the chambers 44 within said cylinders 42 and 43 function as combustion chambers.

Arranged for operation within the combustion chambers 44 are pistons such as 45 that are duplicates of the pistons 24 and connecting the two pistons 45 with the pin 16 which forms a part of the rear one of the five cranks are conventional connecting rods such as 46. The second cylinder from the rear ends of the two rows, and which are designated by the numerals 47 and 48 respectively, are of the two-diameter type with the portions 49 of least diameter being formed in the head ends of the cylinders and functioning as combustion chambers and the portions 50 of largest diameter, and which are formed in the crank ends of the cylinders functioning as charge volume pumping chambers.

Arranged for operation within these two two-diameter chambers are two-diameter pistons, the portions 51 of least diameter operating within the chambers 49 and the portions 52 of greatest diameter operating within the pumping chambers 50 and functioning as charge volume pumping pistons. The two two-diameter pistons just described are both connected by conventional connecting rods such as 52 to pin 17 which forms a part of the second crank throw from the rear end of the crank shaft.

Arranged on top of the respective pairs of cylinders 42, 47, and 43, 48, are head blocks such as 54 within which are formed ducts or chambers 55 that are duplicates of the chambers 34 and said chambers 55 connecting the head ends of the combustion chambers 44 and 49 and functioning as common compression and combustion clearance chambers for said combustion chambers 44 and 49.

An ignition device such as a spark plug 56 is seated in the side of head block 54 and projects into the chamber 55 at a point directly above combustion chamber 44.

Formed through the walls of cylinders 42 and 43 are charge volume inlet ports such as 57 that are located so that they are uncovered and open only when the pistons 45 that operate within the combustion chambers 44 are at the lower or outer ends of their strokes.

Formed through the walls of cylinders 47 and 48 and leading from the combustion chambers 49 therein are exhaust ports 58 that are located so that they are uncovered and open only while the pistons 50 that operate within said chambers are at the lower ends of their strokes.

Formed through the walls of cylinders 47 and 48 and leading from the upper ends of the pumping chambers 50 therein are pumped charge volume outlet ports such as 59. Leading from the charge volume outlet ports 41 of cylinder 27 to the inlet ports 26 into the combustion chamber within cylinder 22 is a pumped charge volume transfer duct 60, and a corresponding transfer duct 61 leads from the pumped charge volume outlet port 59 of cylinder 47 to the charge volume inlet port 57 into the combustion chamber within cylinder 43.

A pumped charge volume transfer duct 62 leads from the pumped charge volume outlet ports from the pumping chamber within cylinder 28 to the charge volume inlet ports 57 that lead to the combustion chamber 44 within cylinder 42. A corresponding transfer duct 63 leads from the pumped charge volume outlet ports from the pumping chamber 50 in cylinder 48 to the inlet port 26 that leads to the combustion chamber 23 in cylinder 21.

Arranged between the intermediate cylinders 27 and 47, and 28 and 48 of the two rows are piston valve cylinders such as 64 and extending from the top of each of these cylinders downwardly thereinto a short distance is an axially disposed tubular member 65.

Arranged on top of each cylinder 64 is a coupling member 66 that communicates directly with the upper end of tubular member 65 and said member 66 is connected to a suitable source of gaseous fuel supply, for instance, a carburetor.

Formed in the wall of each piston valve cylinder 64 and on opposite sides thereof, are short vertically disposed ducts 67 and 68, the lower ends thereof being open and communicating respectively with the gaseous fuel pumping chambers 30 and 50.

Formed through the wall of each cylinder 64 and establishing communication between the chamber therein and the upper portion of chamber 67 is a port 69 and a similar port 70 is formed through the wall of each cylinder 64 and establishes communication between the lower portion of chamber 68 and the chamber within the piston valve cylinder.

Arranged for reciprocation within each cylinder 64 is a piston valve such as 71 and the two piston valves are connected by conventional connecting rods such as 72 to pin 18 of the intermediate crank throw of the crank shaft. The upper portion of piston valve 71 is tubular in form and it fits snugly within the annular chamber between the tubular member 65 and the wall of the piston valve cylinder.

Formed in the lower portion of the wall of this tubular extension and immediately above the head 73 of the piston valve body are diametrically arranged ports 74 and 75 that are adapted to register respectively with the ports 69 and 70 during the reciprocation of the piston valve.

The operation of my improved engine is as follows:

Upon the ignition of a compressed gaseous fuel charge in chamber 34 the expansion and rise in pressure resulting from combustion of the charge will drive pistons 24 and 32, 31, downward or outward and the power and motion thus developed will be transmitted through connecting rods 25 and 39 to the crank pins 14 and 15 of the crank shaft, it being understood that the two-diameter piston 31, 32, travels slightly in advance of piston 24 due to the relative angular positions of the crank throws having the pins 14 and 15.

During the downward or outward strokes of the pistons as just described, piston valve 71 is moving upward or inward and port 74 is in register with port 69. Thus as the larger diameter portion 31 of the two-diameter piston moves downward and while ports 69 and 74 are in registration with each other, a gaseous fuel charge will be drawn from the source of supply through tubular member 65, coinciding ports 74 and 69, and duct 67 into the pump chamber 30 and during this induction of the fresh gaseous fuel charge into pump chamber 30, the inlet port 75 is out of registration with inlet port 70 on the opposite side of the piston valve due to the offset or staggered position of port 70 relative to port 74.

As piston 31, 32, approaches, passes and begins to move inward or upward from low center, exhaust ports 40 are uncovered, thereby permitting the products of combustion and burnt gases to exhaust through said ports and this exhaust function is accelerated and enhanced by the admission of a pumped fuel charge that is admitted to combustion chamber 36 through ports 26 while the latter are uncovered and open as a result of the piston 29 passing low center. This charge of gaseous fuel to combustion chamber 23 is pumped from the pump chamber in cylinder 48 that is in the opposite row of cylinders, through duct 63 which leads to inlet port 26 and in this connection it will be understood that by virtue of the diametrically opposite arrangement of the cranks 14 and 15, and 16 and 17, the pistons in cylinders 43 and 48 are moving upward while the pistons in cylinders 21 and 27 are moving downward or outward.

As pistons 24 and 31, 32 move upward, the inlet ports 26 and exhaust ports 40 are closed practically at the same time and on the succeeding upward travel of said pistons the fresh charge volume admitted to the dual combustion chamber through inlet ports 26 will be compressed in the common clearance chamber 34 until the pistons pass high center, whereupon the compressed charge will be ignited by a spark produced between the terminals of the electrode of plug 38 and as said compressed charge is ignited the pistons will be again driven downward on the power stroke. The fresh gaseous fuel charge drawn into pump chamber 31 on the downward stroke of piston 31, 32, will, on the upward stroke of said piston, be forced out through port 41 and through transfer duct 60 to the inlet port that leads to the combustion chamber within cylinder 22 that is disposed directly opposite cylinder 21.

It will be understood that the operation of the pistons within all four pairs of cylinders are identical but that, in accordance with the angular relation of the crank throws of the crank shaft, the pistons in the cylinders 42, 47, and 43, 48, travel simultaneously with, but in opposite direction to, the travel of the pistons in cylinders 21 and 27, and 22 and 28. Thus as the two-diameter piston in cylinder 48 moves upward or inward a gaseous fuel charge will be pumped through transfer duct 63 to the combustion chamber within cylinder 21 and as the two-diameter piston in cylinder 28 moves upward or inward, a gaseous fuel charge will be pumped through transfer duct 62 into the combustion chamber 44 in cylinder 42. Likewise, as the two-diameter piston in cylinder 27 moves upward or inward, a gaseous fuel charge will be pumped through transfer duct 60 to the combustion chamber in cylinder 22 and a gaseous fuel charge will be pumped during the upward stroke of the two-diameter piston in cylinder 47 through transfer duct 61 to the combustion chamber in cylinder 43. During the downward travel of each piston valve 71 port 74 moves below and out of registration with port 69 and port 75 moves into registration with port 70 and thus each piston valve functions properly for the admission of fresh gaseous fuel charges into the pump chambers 30 in the cylinders 27 and 28, and the corresponding pump chambers 50 in cylinders 47 and 48.

Thus it will be seen that I have provided a two stroke cycle engine that is relatively simple in construction, capable of being easily and cheaply produced, and in which all power pumping pistons and piston valves are directly connected to one main crank shaft. Owing to the V-arrangement of the two rows of cylinders, the engine has a relatively short overall length and the power impulses are delivered to the crank shaft so as to produce practically uniform torque of great power.

It will be understood that minor changes in the size, form and construction of the various parts of my improved two stroke cycle engine may be made and substituted for those herein shown and described without departing from the spirit of my invention, the scope of which is set forth in the appended claims.

I claim as my invention:

1. In a two stroke cycle internal combustion engine, two rows of four cylinders each arranged to form a V-structure, the eight cylinders being arranged in four pairs with the head ends of the members of each pair connected by a common compression and combustion clearance chamber, one cylinder of each of the four pairs having a two-diameter bore, the larger portion of each two-diameter bore functioning as a pump chamber, pistons arranged for operation within the eight cylinders, the pistons within the two diameter bore cylinders having corresponding different diameters, a crank shaft having five throws, separate connections from the eight pistons to four of the throws of said crank shaft, charge volume transfer ducts leading from the pumping chambers of the two-diameter bore cylinders in each row to one of the combustion chambers in each pair of cylinders in the opposite row, piston valves for controlling the admission of gaseous fuel to the pump chambers of the two-diameter bore cylinders and connections from the two piston valves to the fifth throw of the crank shaft.

2. In a two stroke cycle internal combustion engine, eight main cylinders arranged in two rows of four cylinders each, the four cylinders in each row being arranged in pairs with the head ends of the members of each pair connected by a common compression and combustion clearance chamber, one cylinder of each pair having a two-diameter bore, the portion of greatest diameter in each two-diameter bore cylinder functioning as a pump chamber, pistons arranged for operation within the eight cylinders, the piston within each two-diameter bore cylinder having two diameters, a crank shaft having four main crank throws to which the pistons within the eight cylinders are separately connected, the two rows of cylinders being arranged 90° apart and with the axes of the cylinders intersecting the axis of the crank shaft, valvular means actuated from the crank shaft for admitting gaseous fuel to the pump chambers of the two-diameter cylinders and gaseous fuel transfer ducts leading from the pump chambers of the two-diameter cylinders in each row to one of each pair of combustion chambers in the opposite row.

3. In a two-stroke cycle internal combustion engine, two rows of four cylinders each arranged to form a V-structure, the eight cylinders being arranged in four pairs with the head ends of the members of each pair connected by a common compression and combustion clearance chamber, one cylinder of each of the four pairs having a two-diameter bore, the larger portion of each two-diameter bore functioning as a pump chamber, pistons arranged for operation within the eight cylinders, the pistons within the two diameter bore cylinders having corresponding different diameters, a crank shaft having five throws, separate connections from the eight pistons to four of the throws of said crank shaft, the crank throws to which the two-diameter pistons are connected being angularly disposed in advance in the direction of crank rotation from the cranks to which the pistons in the cylinders having the straight diameter bores are connected, charge volume transfer ducts leading from the pumping chambers of the two-diameter bore cylinders in each row to the one of the combustion chamber cylinders having a straight diameter bore in each pair of cylinders in the opposite row, piston valves for controlling the admission of gaseous fuel to the pump chambers of the two-diameter bore cylinders and connections from the two piston valves to the fifth throw of the crank shaft.

4. In a two stroke cycle internal combustion engine, eight main cylinders arranged in two rows of four cylinders each, the four cylinders in each row being arranged in pairs with the head ends of the members of each pair connected by a common compression and combustion clearance chamber, one cylinder of each pair having a two-diameter bore, the portion of greatest diameter in each two-diameter bore cylinder functioning as a pump chamber, pistons arranged for operation within the eight cylinders, the piston within each two-diameter bore cylinder having two diameters, a crank shaft having four main crank throws to which the pistons within the eight cylinders are separately connected, the crank throws to which the two-diameter pistons are connected being angularly disposed in advance in the direction of crank rotation from the cranks to which the pistons in the cylinders having the straight diameter bores are connected, the two rows of cylinders being arranged 90° apart and with the axes of the cylinders intersecting the axis of the crank shaft, valvular means actuated from the crank shaft for admitting gaseous fuel to the pump chambers of the two-diameter cylinders and gaseous fuel transfer ducts leading from the pump chambers of the two-diameter cylinders in each row to the cylinder of straight diameter one of each pair of combustion chambers in the opposite row.

5. In a two stroke cycle internal combustion engine, the combination of ten cylinders and one crank shaft, the ten cylinders being arranged in two angularly disposed rows of cylinders with five cylinders in each row, each of the five cylinders of each row being centered on a line parallel with the axis of the crank shaft, the relatively angular position of the two rows of five cylinders, each being 90°, the axial line of the cylinders of each row of five cylinders, constituting the axial lines to which the relative angularity of 90° between the two rows of five cylinders each is established, the first cylinders from each end of each row of five cylinders having straight diameter bores, the second cylinders from each end of the two rows of five cylinders having two diameter bores, the center cylinder of each of the two rows of five cylinders having a straight diameter bore, there being five crank pins of the crank shaft, the second crank pin from each end of said crank shaft being angularly disposed, in advance, in the direction of the crank shaft rotation, relative to the first crank pin from the end of the crank shaft, said angularity between crank pins being relative to each pair, first and second from a given end of the crank shaft, pistons within each of the ten cylinders, separate connections between the pistons of the respective first, second and center cylinders from a given end of each of the two rows of five cylinders each and the corresponding first, second and center crank pin from a given end of the crank shaft and cross transfer ducts joining the second and larger diameter cylinders of one row of cylinders with the straight diameter bore cylinders of the other row of cylinders.

In testimony whereof I affix my signature.

EVERETT R. BURTNETT.